US010139832B2

(12) United States Patent
Sarkar et al.

(10) Patent No.: US 10,139,832 B2
(45) Date of Patent: Nov. 27, 2018

(54) COMPUTER-ASSISTED OR AUTONOMOUS DRIVING WITH REGION-OF-INTEREST DETERMINATION FOR TRAFFIC LIGHT ANALYSIS

(71) Applicant: Intel Corporation, Santa Clara, CA (US)

(72) Inventors: Nandini Sarkar, Phoenix, AZ (US); Teng Jun Nicholas Leow, Penang (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/416,893

(22) Filed: Jan. 26, 2017

(65) Prior Publication Data

US 2018/0211530 A1      Jul. 26, 2018

(51) Int. Cl.
| | | |
|---|---|---|
| *G05D 1/02* | (2006.01) | |
| *G08G 1/0962* | (2006.01) | |
| *G06T 7/70* | (2017.01) | |
| *G06K 9/00* | (2006.01) | |
| *G06K 9/20* | (2006.01) | |

(52) U.S. Cl.
CPC ......... *G05D 1/0274* (2013.01); *G05D 1/0231* (2013.01); *G05D 1/0246* (2013.01); *G06K 9/00825* (2013.01); *G06K 9/2054* (2013.01); *G06T 7/70* (2017.01); *G08G 1/09623* (2013.01); *G05D 2201/0213* (2013.01); *G06T 2207/30252* (2013.01)

(58) Field of Classification Search
CPC .. G05D 1/0231; G05D 1/0246; G05D 1/0274; G08G 1/09623; G06K 9/00825; G06K 9/2054; G06T 7/70
See application file for complete search history.

(56) References Cited

U.S. PATENT DOCUMENTS

| | | | |
|---|---|---|---|
| 6,151,539 A | 11/2000 | Bergholz et al. | |
| 7,398,076 B2 * | 7/2008 | Kubota et al. ... | C08G 1/096725 455/344 |
| 8,134,480 B2 * | 3/2012 | Onome et al. ... | C08G 1/096716 382/104 |

(Continued)

OTHER PUBLICATIONS

International Search Report and Written Opinion dated May 15, 2018 for International Patent Application No. PCT/US2018/014567, 19 pages.

*Primary Examiner* — Dale W Hilgendorf
(74) *Attorney, Agent, or Firm* — Schwabe, Williamson & Wyatt, P.C.

(57) ABSTRACT

Apparatuses, methods and storage medium associated with determining a ROI for traffic light analysis for CA/AD are disclosed herein. In embodiments, a system may include a region-of-interest (ROI) for traffic light analysis component to receive a current pose of the ego vehicle, and to apply the current pose of the ego vehicle to a plurality of traffic light poses to identify a ROI for a determination of a current state of a traffic light to be taken into consideration in provision of assistance to, or autonomous operation of the ego vehicle; and a traffic light analysis component to determine the current state of the traffic light within the ROI. Other embodiments may be disclosed or claimed.

15 Claims, 7 Drawing Sheets

(56) References Cited

U.S. PATENT DOCUMENTS

| | | | | |
|---|---|---|---|---|
| 8,559,673 | B2* | 10/2013 | Fairfield et al. | C08G 1/09623 382/104 |
| 8,620,032 | B2* | 12/2013 | Zeng | C08G 1/09626 382/104 |
| 8,972,076 | B2* | 3/2015 | Ogawa | C08G 1/09623 701/117 |
| 9,734,417 | B2* | 8/2017 | Ferguson et al. | C08G 1/09623 |
| 2003/0040849 | A1 | 2/2003 | Hathout et al. | |
| 2004/0135677 | A1* | 7/2004 | Asam | G08G 1/20 701/33.4 |
| 2008/0243378 | A1* | 10/2008 | Zavoli | G01C 21/28 701/533 |
| 2013/0253754 | A1 | 9/2013 | Ferguson et al. | |
| 2014/0185880 | A1 | 7/2014 | Fairfield et al. | |
| 2015/0177007 | A1 | 6/2015 | Su et al. | |

\* cited by examiner

COMPUTER-ASSISTED OR AUTONOMOUS DRIVING WITH REGION-OF-INTEREST DETERMINATION FOR TRAFFIC LIGHT ANALYSIS

TECHNICAL FIELD

The present disclosure relates to the fields of computer-assisted or autonomous driving, in particular, to apparatuses, methods and storage medium associated with determining a region-of-interest (ROI) for traffic light analysis.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Computer-assisted or autonomous driving (CA/AD) is a complex use case that may have serious injuries or life and death consequences. One of the usage scenarios is to accurately detect location of traffic lights and recognize the signal which has a direct bearing on motion planning. When red, the vehicle should stop. Only when green, the vehicle should go. This is particularly critical on busy urban roads with multi way intersections. Current solutions typically have the disadvantage of relying on static landmarks that have to be pre-determined on a map that covers a route a vehicle intends to traverse.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with determining a ROI for traffic light analysis for CA/AD are disclosed herein. In embodiments, a system may include a region-of-interest (ROI) for traffic light analysis component to receive a current pose of an ego vehicle, and to apply the current pose of the ego vehicle to a plurality of traffic light poses to identify a ROI for a determination of a current state of a traffic light to be taken into consideration in provision of assistance to, or autonomous operation of the ego vehicle; and a traffic light analysis component coupled to the ROI for traffic light analysis component to determine the current state of the traffic light within the ROI, and output the current state of the traffic light within the ROI for use to provide assistance to, or autonomous operation of the ego vehicle.

In embodiments, the system may generate an ego vehicle pose in real time periodically. For each ego vehicle pose, the system may apply it to the plurality of traffic light poses by applying a distance and/or orientation constraint to the ego vehicle pose and the traffic light poses, to identify the ROI for traffic light analysis, for the current ego vehicle pose. In embodiments, the system may analyze a traffic light with the ROI, for its state, by applying shape or contour detection, and/or color or brightness detection.

In embodiments, the system may further include a repository having the traffic light poses. The system may also include a localization unit to determine the current ego vehicle pose periodically, and a camera to capture an image of the objects before the vehicle (while the vehicle is in the current pose) for the ROI streamlined traffic light analysis for the current ego vehicle pose.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs generated from a plurality of programming instructions, a combinational logic circuit, and/or other suitable components that provide the described functionality.

Figure 1:
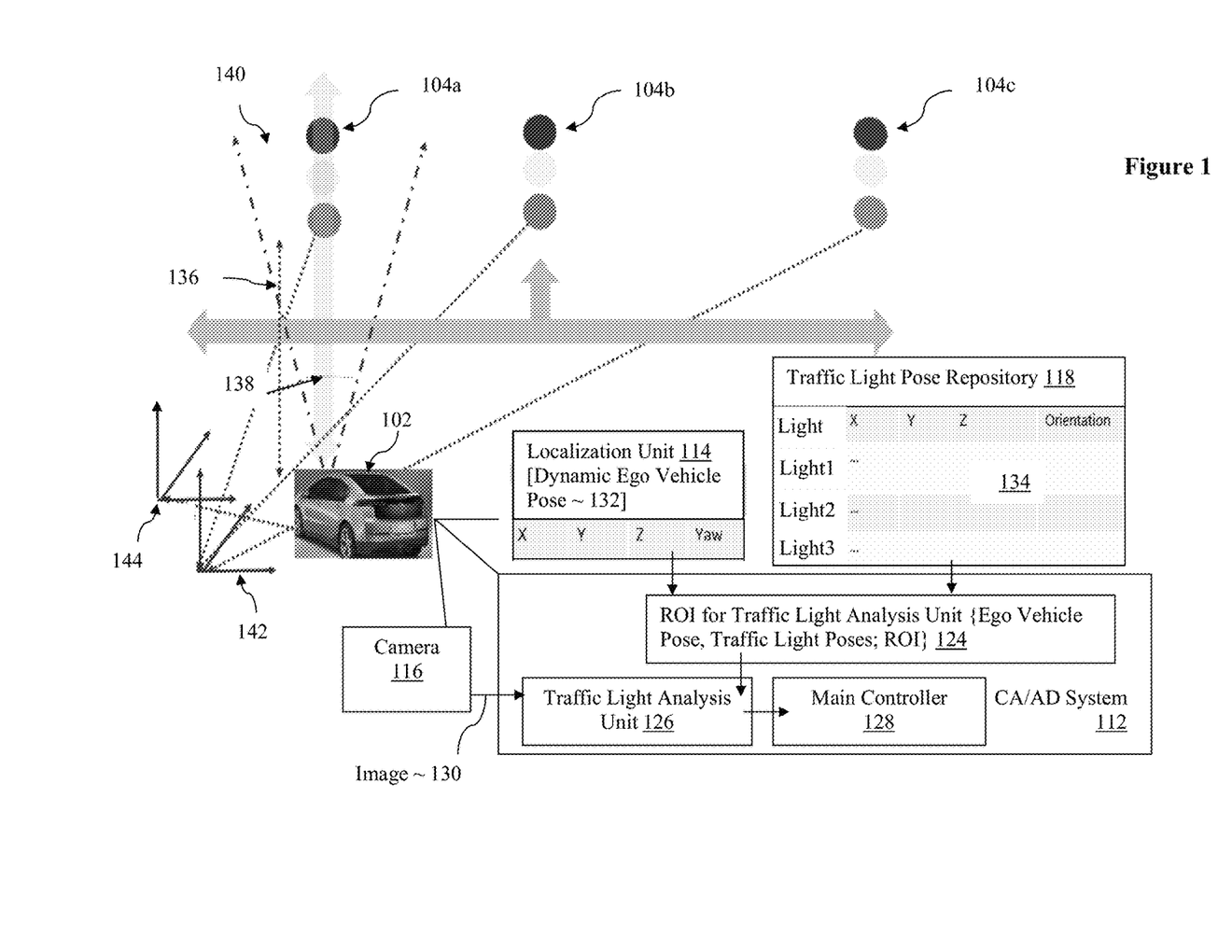
FIG. 1 illustrates a system for providing CA/AD of a vehicle, including identification of a ROI for traffic light analysis, in accordance with various embodiments.

Referring now FIG. 1, wherein a system for providing CA/AD to a vehicle, including identification of a ROI for traffic light analysis, in accordance with embodiments, is illustrated. A shown, in embodiments, ego vehicle 102 having traditional components like engine, transmission, drive train, braking system, wheels, passenger compartment, trunk and so forth (not shown), may be equipped with CA/AD system 112 have the ROI for traffic light analysis technology of the present disclosure, to enhance the ability of CA/AD system 112 to provide CA/AD to ego vehicle 102, as it traverses along a route using a navigation map (hereinafter, simply "map"). In embodiments, ego vehicle 102 may be further configured with location unit 114, camera 116 and traffic light pose repository 118 to complement the ROI for traffic light analysis technology of the present disclosure, incorporated with CA/AD system 112. In alternate embodiments, at least traffic light pose repository 118 may be remotely disposed, with ego vehicle 102 having access, e.g., through wireless communication.

Location unit 114 may be configured to periodically determine in real time a current pose 132 of ego vehicle 102 as it travels on a route under the computerized assistance or autonomous operation of CA/AD system 112. CA/AD system 112 may provide the computerized assistance or autonomous operation of ego vehicle 102 to traverse a route using a map (not shown). Each periodically determined current pose 132 may include the current coordinates {X, Y, Z} and current yaw of ego vehicle 102, at a current location on the route. The values of coordinates {X, Y, Z} and yaw may be in reference to an origin of the coordinate system 144 of the map.

Traffic light pose repository 118 may include a plurality of static traffic light poses 134. Each traffic light pose 134 may include its location coordinates {X, Y, Z} and orientation. The values of coordinates {X, Y, Z} and orientation may be in reference to an origin of a traffic light coordinate system 142, which may be different from map coordinate system 144.

Camera 116 may be configured to capture an image 130 of objects on the horizon before ego vehicle 102 for traffic light analysis, for each periodically determined ego vehicle pose 132, e.g., an image 130 having traffic lights 104a-104c.

CA/AD system 112 may be equipped with the technology of the present disclosure for determining in real time a ROI for traffic light analysis for a current ego vehicle pose. The technology enables a ROI, e.g., ROI 140, to be efficiently identified in real time for each periodically determined current pose 132 of ego vehicle 102, thereby streamlining the traffic light state analysis for the current pose 132, to focus on traffic light 104a within ROI 140. In embodiments, the technology allows traffic light coordinate system 142 and map coordinate system 144 to be different coordinate systems, and/or applies distance 136 and/or orientation 138 constraints. The technology may be particularly helpful when multiple traffic lights 104a-104c are present at an intersection on the travel route of vehicle 102, enabling CA/AD system 112 to focus on the relevant traffic light 104a within ROI 140, and take its state (red, yellow or green) into consideration in providing computer-aided assistance or autonomous operation, while ignoring the non-relevant traffic lights 104b-104c.

As illustrated, in embodiments, CA/AD system 112 may include a plurality of components 124-128. These components 124-128 may include ROI for traffic light analysis unit 124, traffic light analysis unit 126 and main controller 128, coupled with each other as shown. Each component, ROI for traffic light analysis unit 124, traffic light analysis unit 126 and main controller 128 may be implemented in hardware, such as ASIC or programmable circuits, or software, such as programming instructions executed by a processor-memory arrangement, or both. These components 124-128 and other aspects of efficiently identifying a ROI for traffic analysis for CA/AD will be further described in more detail below with references to the remaining figures, FIGS. 2-8.

Figure 2:
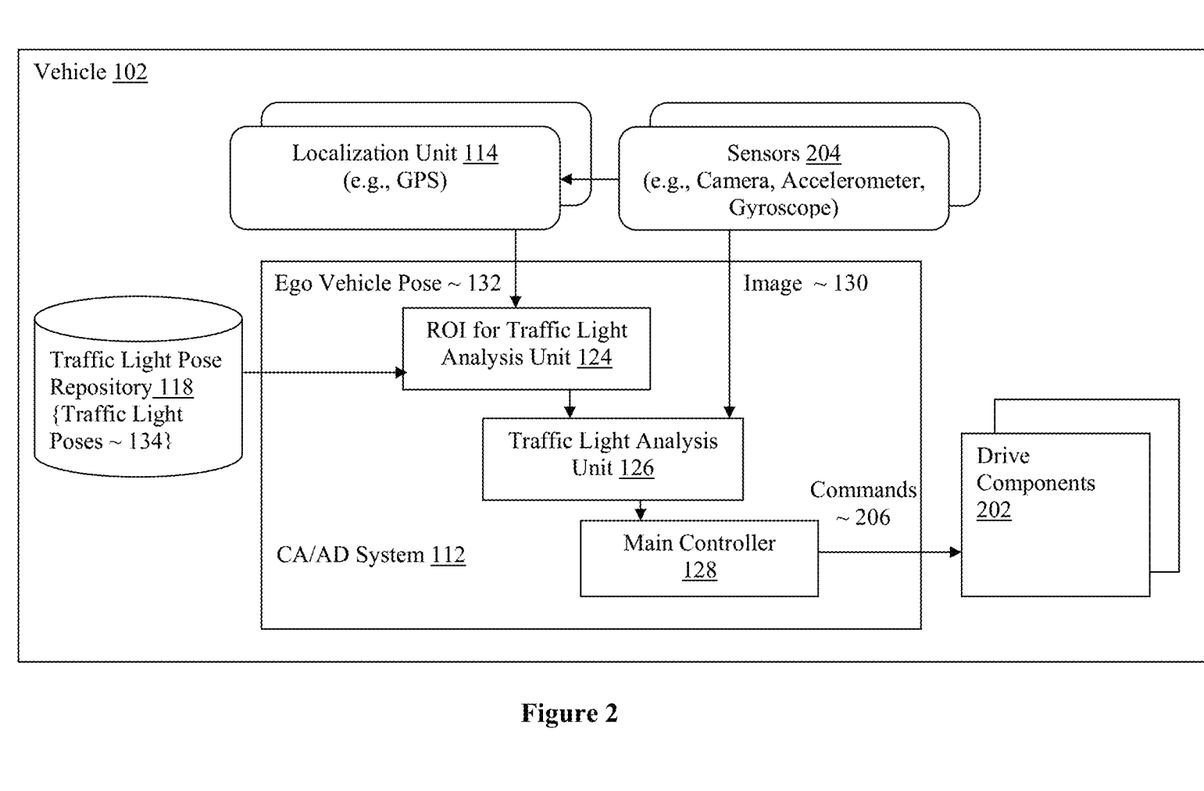
FIG. 2 illustrates a component view of a vehicle equipped with the CA/AD system of FIG. 1, in accordance with various embodiments.

Referring now to FIG. 2 wherein a component view of a vehicle equipped with the CA/AD system of FIG. 1, in accordance with various embodiments, is illustrated. As shown, in embodiments, vehicle 102 may include various drive components 202, sensors 204, and earlier introduced location unit 114, traffic light pose repository 118, and CA/AD system 112. As described earlier, drive components 202 may include engine, transmission, drive train, braking system, and so forth. Sensors 204 may include earlier described camera 116, and other sensors, such as accelerometer, gyroscope, speedometer, rain sensor, temperature sensors, sensors for detecting passenger compartment door or trunk open, and so forth. Camera 116, as described earlier, may be configured to capture an image 130 of objects before ego vehicle 102 for traffic light analysis for each current ego vehicle pose. Except for how images 130 captured by camera 116 are used by CA/AD system 112 to quickly and efficiently analysis traffic light, using the ROI technology of the present disclosure, and how CA/AD system 112 use the ROI technology to improve its control of drive components 202, drive components 202 and sensors 204 (including camera 116) may otherwise be any one of a number of these elements known in the art.

Localization unit 114, as described earlier, may be configured to periodically determine a current pose of vehicle 102 as it travels along a route using a map. For the illustrated embodiments, localization unit 114 may include a global positioning system (GPS). Localization unit 114 may determine ego vehicle pose 132 using GPS, and sensor data from gyroscope, accelerometer and so forth. Each periodically determined current pose 132, using GPS and sensor data, as described earlier, may include the current coordinates {X, Y, Z} and current orientation of ego vehicle 102, at a current location on the route. The values of coordinates {X, Y, Z} and orientation may be in reference to an origin of the coordinate system 144 of the map.

Traffic light pose repository 118, as described earlier, may include a plurality of static traffic light poses 134. In embodiments, traffic light pose repository 118 may be stored in a mass storage medium, such as solid state persistent memory, system memory or cache memory. In embodiments, traffic light pose repository 118 disposed on ego vehicle 102 may be a subset of a larger traffic light pose repository downloaded onto ego vehicle 102. For example, the subset may include only traffic light poses in North America, or in the State of Washington, by virtue of the fact ego vehicle 102 is licensed and principally operates in North America/State of Washington. As described earlier, each traffic light pose 134 may include its location coordinates {X, Y, Z} and orientation. The values of coordinates {X, Y, Z} and orientation may be in reference to an origin of a traffic light coordinate system 142, which may be different from map coordinate system 144.

In embodiments, the traffic light pose coordinates may be collected by first collecting the GPS coordinates of the traffic light locations (e.g., by driving around the geographical region supported, and then transformed (e.g., through a wgs84 geodetic transformation process) to an earth-centered, earth-fixed (ECEF) or East North Up (ENU) coordinate system. In alternate embodiments, the traffic light pose coordinates could also be a Light Detection and Ranging (LiDAR) point cloud data structures from a static map origin. The mechanism to build the traffic light pose repository 118 would be to log the precise pose of the vehicle and a camera image with exact timestamp while driving around and then compute the location against the map offline. Focus may be to examine intersections since traffic lights are typically located there.

CA/AD system 112, as described earlier, may include ROI for traffic light analysis unit 124, traffic light analysis unit 126 and main controller 128, coupled to each other as shown. In embodiments, ROI for traffic light analysis unit 124 may be configured to apply a periodically determined ego vehicle pose 132 to traffic light poses 134 in repository 118 to identify the ROI 140 having the relevant traffic light 104a, on which traffic light analysis should be focused. On identification, ROI for traffic light analysis unit 124 may output description/definition of the identified ROI 140 for traffic light analysis unit 126.

In embodiments, traffic light analysis unit 126 may be configured to streamline and focus its analysis of traffic light state in accordance with ROI 140 identified by ROI for traffic light analysis unit 124. On analysis, having determined the state of traffic light 104a within ROI 140 {Red, Yellow, Green}, traffic light analysis unit 126 may output the determined state for main controller 128.

In embodiments, main controller 128 may be configured to provide commands 206 to the various drive components 202 to drive or assist the driving of ego vehicle 102 along the travel route, taking into consideration of the determined state of the traffic light within the identified ROI. For example, main controller 128 may be configured to provide commands 206 to decelerate and stop ego vehicle 102 when the state of traffic light is determined to be "red" or "yellow" (when ego vehicle 102 is moving) or to start and/or continue to drive ego vehicle 102 when the state of traffic light is determined to be "green" or "yellow" (when ego vehicle 102 is stopped).

An example process for providing computerized assistance or autonomous operation of vehicle 102, including an example process for identifying a ROI for traffic light analysis, and an example process for determining a state of a traffic light, that may be practiced by CA/AD system 112, in particular, by ROI for traffic light analysis Unit 124 and by traffic light analysis unit 126 will be described with references to FIGS. 3-5.

Figure 3:
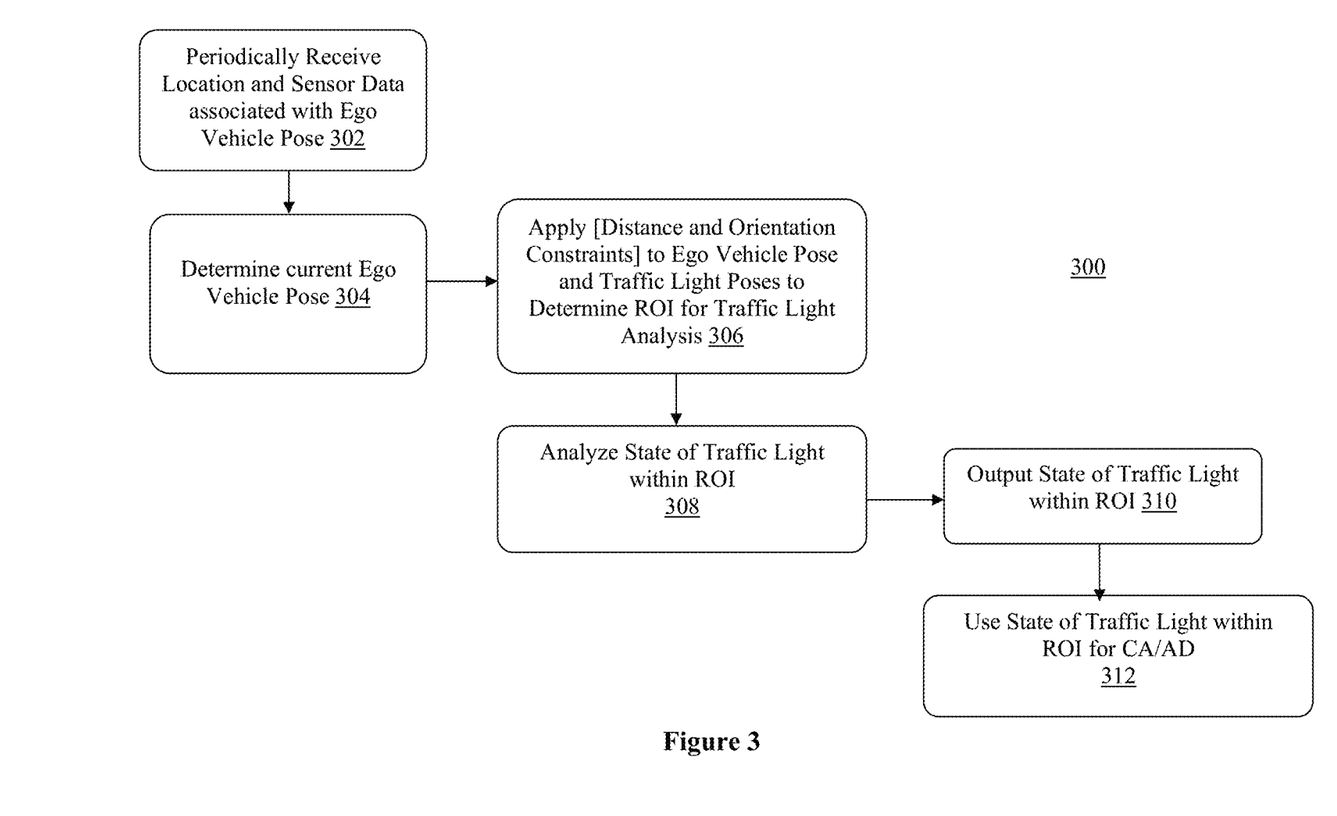
FIG. 3 illustrate an example process for providing CA/AD of a vehicle, including determining a ROI for traffic analysis, in accordance with various embodiments.

Referring now to FIG. 3, wherein an example process for providing computerized assistance or autonomous operation of a vehicle, in accordance with various embodiments, is illustrated. As shown, in embodiments, process 300 for providing computerized assistance or autonomous operation of a vehicle may include operations performed in blocks 302-312. The operations may be performed e.g., by localization unit 114, ROI for traffic light analysis unit 124, traffic light analysis unit 126, and main controller 128 of FIG. 1 or 2.

In embodiments, process 300 may start at block 302. At block 302, location and/or sensor data associated with ego vehicle pose may be periodically received, e.g., by localization unit 114, from e.g., GPS satellites and sensors 204.

Next, at block 304, on receipt of each set of location and/or sensor data at a point in time for analyzing state of traffic lights, the current ego vehicle pose may be determined. As described earlier, the current ego vehicle pose may be expressed in term of a set of coordinate and yaw values relative to the origin of the coordinate system of the map used for traversing a route. In embodiments, on determination of the current ego vehicle pose, the current ego vehicle pose may be outputted for identification of ROI for traffic light analysis, e.g., to ROI for traffic light analysis unit 124.

Next, at block 306, on receipt of the current ego vehicle pose, the current ego vehicle pose may be applied, e.g., by ROI for traffic light analysis unit 124, to a set of pre-determined static traffic light poses, e.g., those stored in repository 118, to identify a ROI for traffic light analysis. In embodiments, the set of pre-determined static traffic light poses may be expressed in reference to an origin of a traffic light coordinate system that is different from the map coordinate system. For these embodiments, the application of the current ego vehicle pose to the set of pre-determined static traffic light poses, may include transformation of the coordinate and yaw values of the current ego vehicle pose to coordinate and yaw values that reference the original of the traffic light coordinate system. In embodiments, on transformation of the coordinate and yaw values of the current ego vehicle pose, the application of the current ego vehicle pose to the set of pre-determined static traffic light poses may further include applying distance and/or orientation constraints to identify the ROI. On determination, description or definition of the identified ROI may be outputted. An example process for applying distance and/or orientation constraints to identify the ROI will be described further below with references to FIG. 4.

Next, at block 308, state of the traffic light within the identified ROI may be analyzed and determined, e.g., by traffic light analysis unit 126. An example process for determining the state of a traffic light will be described further below with references to FIG. 5. At block 310, the determined state of the traffic light within the identified ROI may be outputted, e.g., to main controller 128. Then, at block 312, the determined state of the traffic light within the identified ROI may be taken into consideration in the provision of computerized assistance or autonomous operation the ego vehicle.

Figure 4:
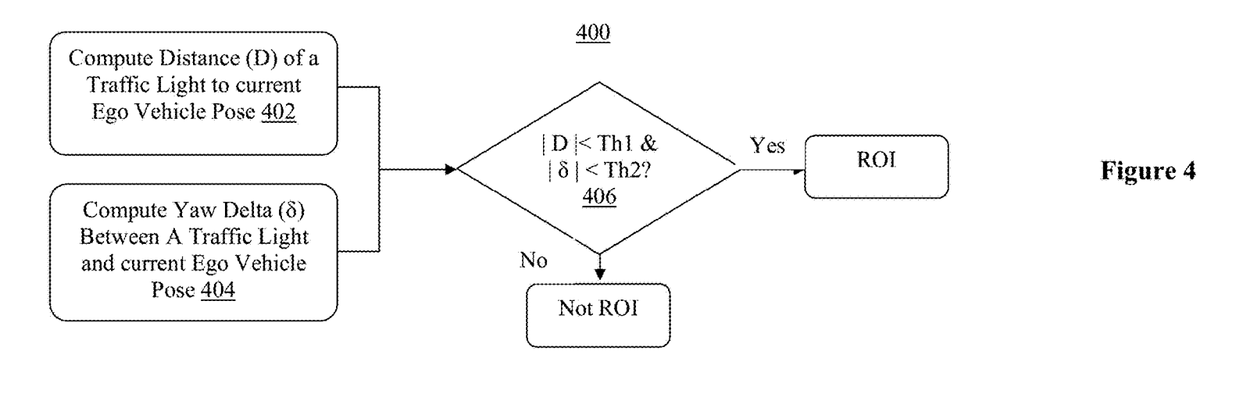
FIG. 4 illustrate an example process for determining a ROI for traffic light analysis, in accordance with various embodiments.

Referring now to FIG. 4, wherein an example process for applying distance and/or orientation constraint to identify a ROI for traffic light analysis, in accordance with various embodiments, is illustrated. As shown, process 400 for applying distance and/or orientation constraint to identify a ROI for traffic light analysis, for a current vehicle pose, may include operations performed at blocks 402-406. In embodiments, the operations may be performed, e.g., by ROI for traffic light analysis unit 124.

In embodiments, process 400 may begin at blocks 402 and 404. At block 402, distance (D) of a traffic light to a current ego vehicle pose may be calculated. The distance (D) may be calculated using the transformed coordinates of the current ego vehicle pose, and the coordinates of the pose of a particular traffic light under consideration. At block 404, yaw delta ($\delta$) between the traffic light and the current ego vehicle pose may be calculated. Similarly, the yaw delta ($\delta$) may be calculated using the transformed yaw values of the current ego vehicle pose, and the orientation of the pose of a particular traffic light under consideration.

Next, at block 406, a determination may be made on whether D is less than a distance threshold (Th1), and at the same time, whether $\delta$ is less than an orientation threshold (Th2). In embodiments, if both D and $\delta$ are determined to be less than their respective thresholds (Th1 and Th2), a region of the frontal view of the ego vehicle containing the traffic light with the traffic light pose would be identified as a ROI for traffic light analysis. On the other hand, if at least one of D or δ is determined not to be less than the corresponding threshold (Th1 or Th2), a region of the frontal view of the ego vehicle containing the traffic light with the traffic light pose would not be identified as a ROI for traffic light analysis.

In embodiments, the operations at block 402-406 may be performed for each of the traffic light poses in repository 118, for each periodically generated ego vehicle pose.

Figure 5:
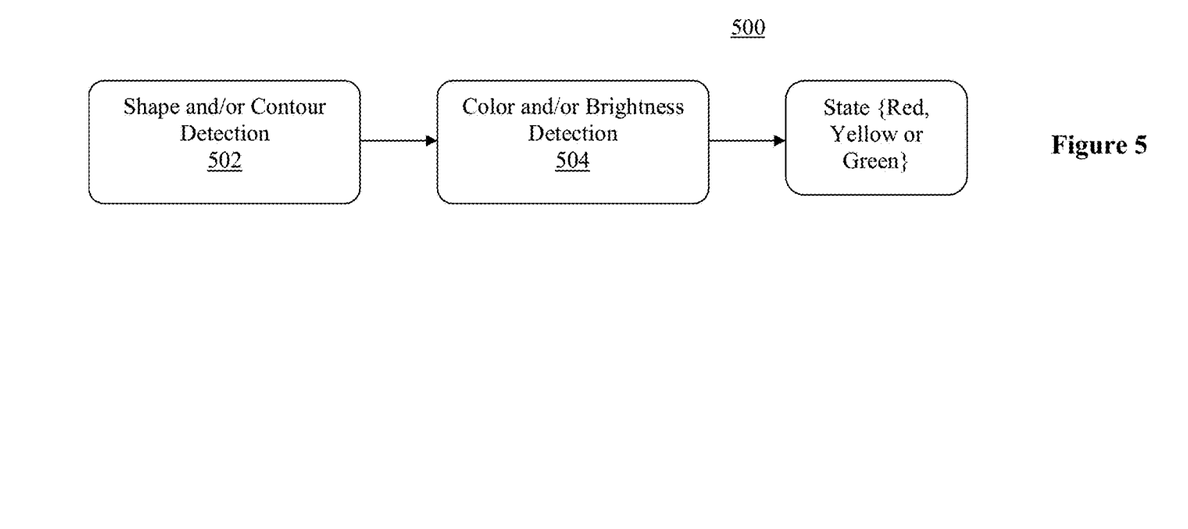
FIG. 5 illustrate an example process for analyzing a state of a traffic light, in accordance with various embodiments.

Referring now to FIG. 5, wherein an example process for analyzing a state of a traffic light, in accordance with various embodiments, is illustrated. As shown, process 500 for analyzing a state of a traffic light may include operations performed at blocks 502-504. The operations at blocks 502-504 may be performed e.g., by traffic light analysis unit 126.

In embodiments, process 500 may start at block 502. At block 502, shape and/or contour detection may be performed in an area of an image of the object before the vehicle (while the vehicle is at the current ego vehicle pose), that corresponds to the identified ROI for traffic light analysis, to identify the individual lights of the traffic light within the identified ROI.

Next at block 504, on identification of the individual lights of the traffic light within the identified ROI, color and/or brightness detection may be performed to determine whether the state of the traffic light is Red, Yellow or Green. On determination, the state may be outputted, e.g., to main controller 128, for main controller 128 to take into consideration in providing commands to various drive components 202 in providing CA/AD to vehicle 102.

Figure 6:
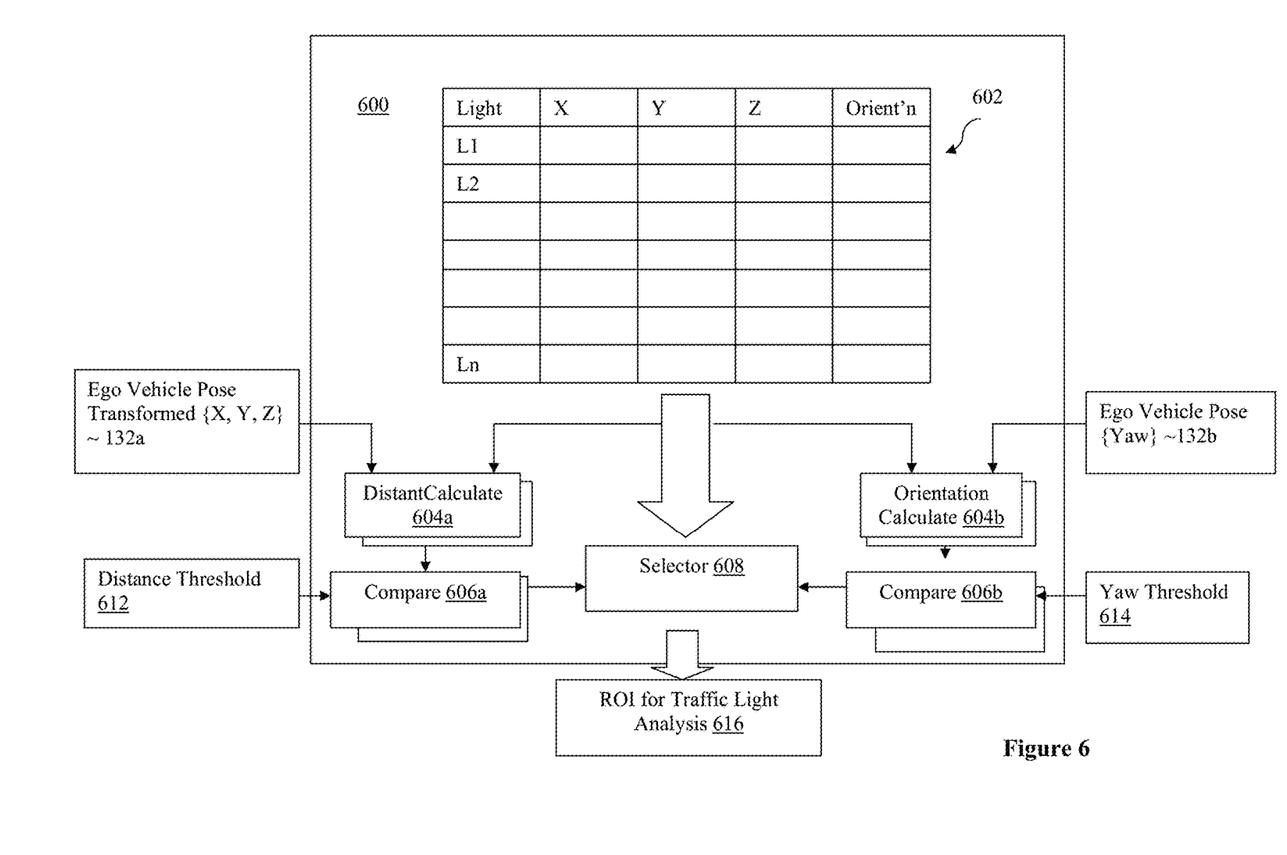
FIG. 6 illustrates a content-addressable memory arrangement for applying distance and/or orientation constraint to identify a ROI for traffic light analysis, in accordance with various embodiments.

Referring now to FIG. 6, wherein a content-addressable memory arrangement for applying distance and/or orientation constraint to identify the ROI for traffic light analysis, in accordance with various embodiments, is illustrated. As shown, in embodiments, content-addressable memory arrangement 600 may be employed to store the various traffic light poses and apply the distance and orientation constraints to the various traffic light poses and a current ego vehicle pose. Content-addressable memory arrangement 600 may include cache lines 602, distance and orientation calculation circuits 604a-604b, comparators 606a-606b and selector 608, coupled with each other.

Cache lines 602 may be configured to store the traffic light poses with their coordinate and orientation values. Distance calculation circuits 604a may be configured to calculate the distance between an ego vehicle pose 132a (the transformed coordinates) and each traffic light pose (using its coordinates), as the traffic light poses 134 are read out of cache lines 602 in response to an ego vehicle pose. Similarly, orientation calculation circuits 604b may be configured to calculate the yaw delta between an ego vehicle pose 132b (the transformed yaw value) and each traffic light pose (using its orientation), as the traffic light poses 134 are read out of cache lines 602 in response to an ego vehicle pose.

Comparators 606a and 606b may be configured to respectively compare the calculated distances and yaw deltas to the distance and yaw delta thresholds 612 and 614, and output selection signals to selector 608. In embodiments, comparators 606a and 606b may output corresponding signals to denote selection of a traffic light pose with calculated distances or yaw delta that are below the distance and yaw delta thresholds 612 and 614, to identify the ROI for traffic light analysis, and output correspond signals to denote non-selection of a traffic light pose with calculated distances or yaw delta that are equal to or above the distance and yaw delta thresholds. In alternate embodiments, comparators 606a and 606b may output corresponding signals to denote selection when the calculated distances or yaw deltas that are equal to the distance and yaw delta thresholds 612 and 614.

Selector 608 may be configured to in turn use the selection signals to select the traffic light poses to identify the ROI for traffic light analysis 616 when both calculated distance and yaw delta signals denote selection, and non-select the traffic light poses when at least one of the calculated distance or yaw delta signal does not denote selection.

While for ease of understanding, CA/AD system 112 has been described as being disposed in ego vehicle 102, in alternate embodiments, some aspects of CA/AD system 112 (other than main controller 128), like repository 118, may be remotely disposed from ego vehicle 102, and providing results of the ROI and/or traffic light analysis to ego vehicle 102 via wireless communication.

Figure 7:
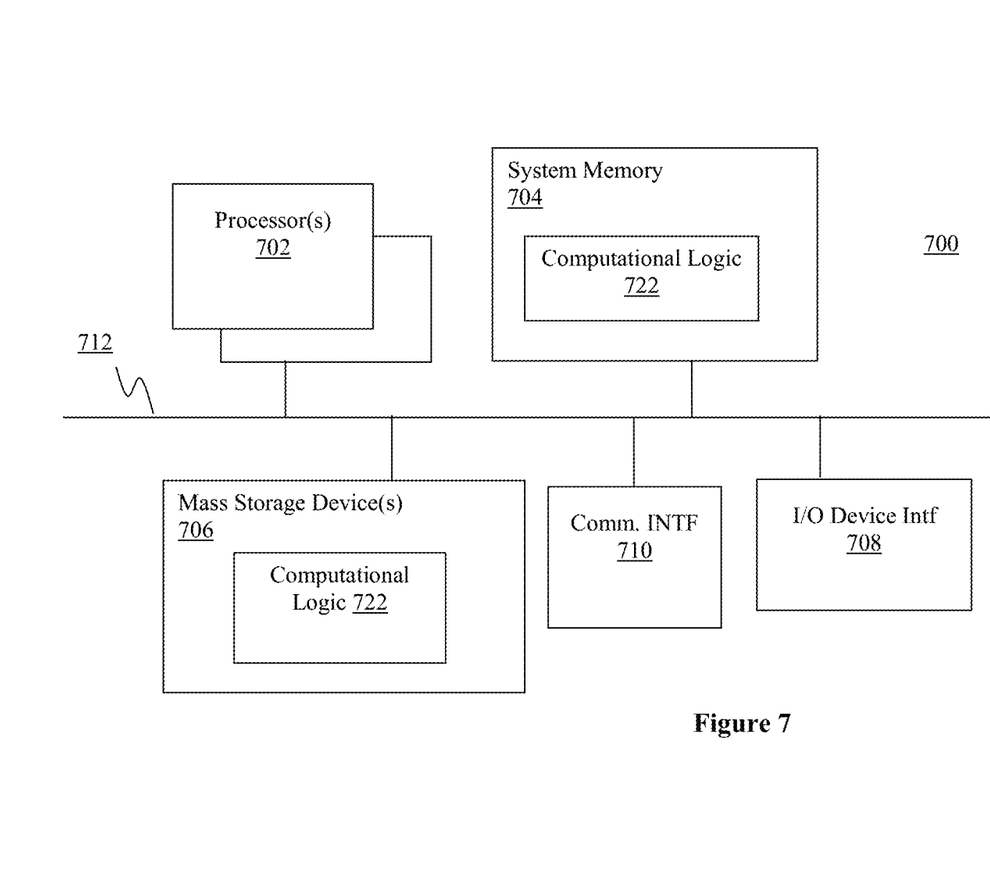
FIG. 7 illustrates a computing system suitable for practicing aspects of the present disclosure, in accordance with various embodiments.

Referring now to FIG. 7, wherein a block diagram of a computer device suitable for practice the present disclosure, in accordance with various embodiments, is illustrated. In embodiments, computer device 700 may be disposed on ego vehicle 102. In alternate embodiments, computer device 700 may be remoted disposed and in wireless communication with ego vehicle 102. As shown, computer device 700 may include one or more processors 702 and system memory 704. Each processor 702 may include one or more processor cores. System memory 704 may include any known volatile or non-volatile memory.

Additionally, computer device 700 may include mass storage device(s) 706 (such as solid state drives), input/output device interface 708 (to interface with various components, such as location unit 114, sensors 204, drive components 202, storage medium having repository 118, and so forth) and communication interfaces 710 (such as network interface cards, modems and so forth). In embodiments, communication interfaces 710 may support wired or wireless communication, including near field communication. The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage device(s) 706 may be employed to store a working copy and a permanent copy of the executable code of the programming instructions implementing the operations described earlier, e.g., but not limited to, operations associated with ROI for traffic light analysis unit 124, traffic light analysis unit 126 and main controller 128. The programming instructions may comprise assembler instructions supported by processor(s) 702 or high-level languages, such as, for example, C, that can be compiled into such instructions.

The permanent copy of the executable code of the programming instructions may be placed into permanent mass storage device(s) 706 in the factory, or in the field, through, for example, a distribution medium (not shown), such as a compact disc (CD), or through communication interface 710 (from a distribution server (not shown)).

The number, capability and/or capacity of these elements 710-712 may vary, depending on the intended use of example computer device 700, e.g., whether example computer device 700 is a smartphone, tablet, ultrabook, a laptop, or a vehicle infotainment system. The constitutions of these elements 710-712 are otherwise known, and accordingly will not be further described.

Figure 8:
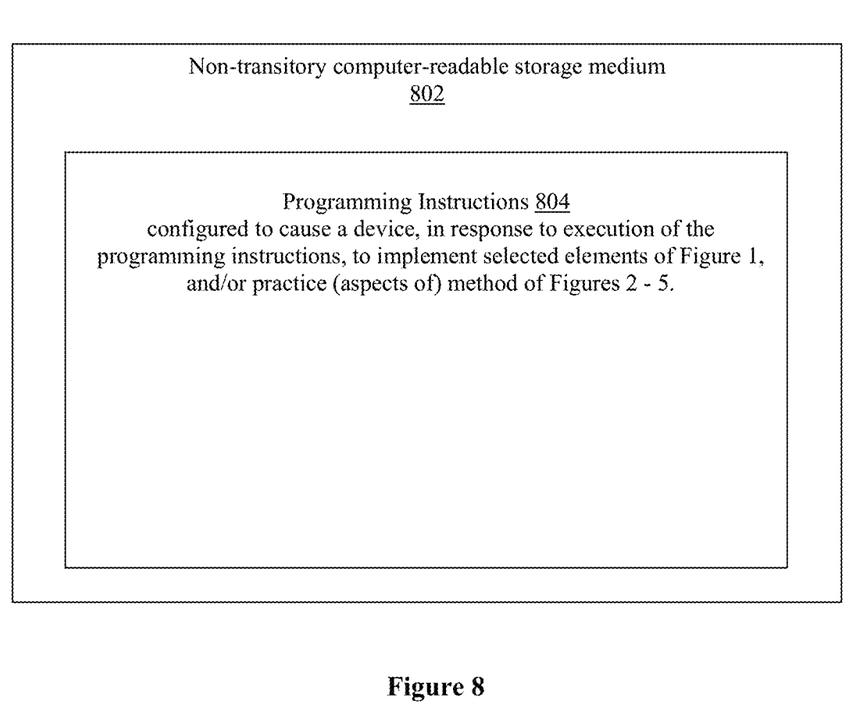
FIG. 8 illustrates an example storage medium with instructions configured to enable a CA/AD system to practice the present disclosure, in accordance with various embodiments.

FIG. 8 illustrates an example non-transitory computer-readable storage medium having instructions configured to practice all or selected ones of the operations associated with operations associated with placement of the shutter button, provision of the previews, determination of blocking, provision of alert, and so forth, earlier described, in accordance with various embodiments. As illustrated, non-transitory computer-readable storage medium 802 may include the executable code of a number of programming instructions 804. Executable code of programming instructions 804 may be configured to enable a device, e.g., computer device 700, in response to execution of the executable code/programming instructions, to perform, e.g., various operations associated with ROI for traffic light analysis unit 124, traffic light analysis unit 126, main controller 128, and so forth, described with references to FIGS. 1-5. In alternate embodiments, executable code/programming instructions 804 may be disposed on multiple non-transitory computer-readable storage medium 802 instead. In still other embodiments, executable code/programming instructions 804 may be encoded in transitory computer readable medium, such as signals.

Referring back to FIG. 7, for one embodiment, at least one of processors 702 may be packaged together with a computer-readable storage medium having some or all of computing logic 722 (in lieu of storing in system memory 704 and/or mass storage device 706) configured to practice all or selected ones of the operations earlier described with references to FIG. 1-5. For one embodiment, at least one of processors 702 may be packaged together with a computer-readable storage medium having some or all of computing logic 722 to form a System in Package (SiP). For one embodiment, at least one of processors 702 may be integrated on the same die with a computer-readable storage medium having some or all of computing logic 722. For one embodiment, at least one of processors 702 may be packaged together with a computer-readable storage medium having some or all of computing logic 722 to form a System on Chip (SoC). For at least one embodiment, the SoC may be utilized in, e.g., but not limited to, a hybrid computing tablet/laptop.

Thus an improved traffic light analysis approach for provision of computerized assistance or autonomous operation of a vehicle has been described. The approach may reduce the latency of traffic light detection because the traffic light location detection operation may be constantly evaluating vehicles' pose against prior known traffic light map and generating a region of interest detection indication when the distance and orientation constraints are met. Parallel tasks of location detection [vehicle pose compared against traffic light map] and traffic light classification [localized to segmented region of interest] may reduce latency for traffic light recognition and its impact on motion planning. It may also enable a failsafe mechanism because the traffic light location may be anticipated in case there is traffic light occlusion and take some preemptive action like vehicle deceleration.

Example 1 may be a system for computer assisted or autonomous driving of an ego vehicle, comprising: a region-of-interest (ROI) for traffic light analysis component to receive a current pose of the ego vehicle, and to apply the current pose of the ego vehicle to a plurality of traffic light poses to identify a ROI for a determination of a current state of a traffic light to be taken into consideration in provision of assistance to, or autonomous operation of the ego vehicle; and a traffic light analysis component coupled to the ROI for traffic light analysis component to determine the current state of the traffic light within the ROI, and output the current state of the traffic light within the ROI for use to provide assistance to, or autonomously operate the ego vehicle.

Example 2 may be example 1, wherein each traffic light pose may comprise coordinates and orientation relative to an origin of a traffic light coordinate system.

Example 3 may be example 2, wherein the current pose of the ego vehicle may comprise coordinates and yaw relative to an origin of a map's coordinate system, wherein the map is employed by the system to provide assistance to, or autonomously operate the ego vehicle to traverse a route.

Example 4 may be example 3, wherein the ROI for traffic light analysis component may transform the coordinates and yaw of the periodically determined current pose of the ego vehicle from relative to the origin of the map's coordinate system to relative to the origin of the traffic light coordinate system.

Example 5 may be example 4, wherein to apply the current pose of the ego vehicle to a plurality of traffic light poses to identify the ROI for a determination of a current state of a traffic light to be taken into consideration, the ROI for traffic light analysis component may apply a distance or an orientation constraint to the transformed coordinates and yaw of the current pose of the ego vehicle and the coordinates and orientations of the plurality of traffic light poses to identify the ROI for a determination of a current state of a traffic light to be taken into consideration.

Example 6 may be example 1, wherein to determine the current state of the traffic light within the identified ROI, the traffic light analysis component may apply shape, contour or color analysis to a region of an image that corresponds to the identified ROI.

Example 7 may be example 6 further comprising one or more sensors including a camera to capture the image.

Example 8 may be example 1 further comprising a localization component coupled to the ROI for traffic light analysis component to periodically determine in real time the current pose of the ego vehicle, and provide the current pose of the ego vehicle to the ROI for traffic light analysis component.

Example 9 may be example 1 further comprising storage medium coupled to the ROI for traffic light analysis component to store the plurality of traffic light poses.

Example 10 may be any one of examples 1-9, wherein the system may be disposed in the ego vehicle.

Example 11 may be a method for computerized assist or autonomous driving of an ego vehicle, comprising: receiving, by a computerized assist or autonomous driving (CA/AD) system of the ego vehicle, a current pose of the ego vehicle; applying, by the CA/AD system, the current pose of the ego vehicle to a plurality of traffic light poses to identify a ROI for determining a current state of a traffic light to be taken into consideration in providing assistance to, or autonomously operating the ego vehicle; determining, by the CA/AD system, the current state of the traffic light within the ROI; and providing, by the CA/AD system, assistance to, or autonomously operating the ego vehicle, based at least in part on the current state of the traffic light within the ROI.

Example 12 may be example 11, wherein each traffic light pose may comprise coordinates and orientation relative to an origin of a traffic light coordinate system, and the current pose of the ego vehicle may comprise coordinates and yaw relative to an origin of a map's coordinate system, the map being employed by the system to provide assistance to, or autonomously operate the ego vehicle to traverse a route; wherein the method may further comprise transforming, by the CA/AD system, the coordinates and yaw of the periodically determined current pose of the ego vehicle from relative to the origin of the map's coordinate system to relative to the origin of the traffic light coordinate system.

Example 13 may be example 12, wherein applying the current pose of the ego vehicle to a plurality of traffic light poses to identify the ROI for determining a current state of a traffic light to be taken into consideration may comprise applying a distance or an orientation constraint to the transformed coordinates and yaw of the current pose of the ego vehicle and the coordinates and orientations of the plurality of traffic light poses to identify the ROI for determining a current state of a traffic light to be taken into consideration.

Example 14 may be any one of examples 11-13, wherein determining the current state of the traffic light within the identified ROI may comprise applying shape, contour or color analysis to a region of an image that corresponds to the identified ROI.

Example 15 may be any one of examples 11-13 further comprising periodically determining, by the CA/AD system, in real time the current pose of the ego vehicle.

Example 16 may be any one of examples 11-13 further comprising receiving and storing the plurality of traffic light poses by the CA/AD system.

Example 17 may be at least one computer readable media (CRM) comprising a plurality of instructions configured to cause a computerized assist or autonomous driving (CA/AD) system of an ego vehicle, in response to execution of the instructions by CA/AD system, to: receive a current pose of the ego vehicle; apply the current pose of the ego vehicle to a plurality of traffic light poses to identify a ROI for a determination of a current state of a traffic light to be taken into consideration in provision of assistance to, or autonomous operation of the ego vehicle; determine the current state of the traffic light within the ROI; and output the current state of the traffic light within the ROI for use for provision of assistance to, or autonomous operation of the ego vehicle.

Example 18 may be example 17, wherein each traffic light pose may comprise coordinates and orientation relative to an origin of a traffic light coordinate system, and the current pose of the ego vehicle may comprise coordinates and yaw relative to an origin of a map's coordinate system, with the map being employed by the system to provide assistance to, or autonomously operate the ego vehicle to traverse a route; wherein to apply the current pose of the ego vehicle to a plurality of traffic light poses may comprise to transform the coordinates and yaw of the periodically determined current pose of the ego vehicle from relative to the origin of the map's coordinate system to relative to the origin of the traffic light coordinate system.

Example 19 may be example 18, wherein to apply the current pose of the ego vehicle to a plurality of traffic light poses may further comprise to apply a distance or an orientation constraint to the transformed coordinates and yaw of the current pose of the ego vehicle and the coordinates and orientations of the plurality of traffic light poses to identify the ROI for a determination of a current state of a traffic light to be taken into consideration.

Example 20 may be example 17, wherein to determine the current state of the traffic light within the identified ROI may comprise to apply shape, contour or color analysis to a region of an image that corresponds to the identified ROI.

Example 21 may be example 17, wherein the CA/AD system is further caused to periodically determine in real time the current pose of the ego vehicle, and provide the current pose of the ego vehicle to the ROI for traffic light analysis component.

Example 22 may be example 17, wherein the CA/AD system is further caused to receive and store the plurality of traffic light poses.

Example 23 may be any one of examples 17-22, wherein the CA/AD system is disposed in the ego vehicle.

Example 24 may be an apparatus of an ego vehicle for computerized assist or autonomous driving of the ego vehicle, comprising: means for receiving a current pose of the ego vehicle; means for applying the current pose of the ego vehicle to a plurality of traffic light poses to identify a ROI for a determination of a current state of a traffic light to be taken into consideration in providing assistance to, or autonomously operating the ego vehicle; means for determining the current state of the traffic light within the ROI; and means for outputting the current state of the traffic light within the ROI for use for providing assistance to, or autonomously operating the ego vehicle.

Example 25 may be example 24, wherein each traffic light pose may comprise coordinates and orientation relative to an origin of a traffic light coordinate system, and the current pose of the ego vehicle may comprise coordinates and yaw relative to an origin of a map's coordinate system, the map being employed by the system to provide assistance to, or autonomously operate the ego vehicle to traverse a route; wherein the apparatus may further comprise means for transforming the coordinates and yaw of the periodically determined current pose of the ego vehicle from relative to the origin of the map's coordinate system to relative to the origin of the traffic light coordinate system.

Example 26 may be example 25, wherein means for applying the current pose of the ego vehicle to a plurality of traffic light poses to identify the ROI for determining a current state of a traffic light to be taken into consideration may comprise means for applying a distance or an orientation constraint to the transformed coordinates and yaw of the current pose of the ego vehicle and the coordinates and orientations of the plurality of traffic light poses to identify the ROI for determining a current state of a traffic light to be taken into consideration.

Example 27 may be example 24-26, wherein means for determining the current state of the traffic light within the identified ROI may comprise means for applying shape, contour or color analysis to a region of an image that corresponds to the identified ROI.

Example 28 may be example 24-26 further comprising means for periodically determining in real time the current pose of the ego vehicle.

Example 29 may be example 24-26 further comprising means for receiving and storing the plurality of traffic light poses by the CA/AD system.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A system for computer assisted or autonomous driving of an ego vehicle, comprising:
   a region-of-interest for traffic light analysis (ROIFTLA) identification component to receive a current pose of the ego vehicle, and to apply the current pose of the ego vehicle to a plurality of traffic light poses to identify a region-of-interest (ROI) in an image of a frontal view of the ego vehicle, for a determination of a current state of a traffic light to be taken into consideration in provision of assistance to, or autonomous operation of, the ego vehicle, the traffic light being within the ROI in the image, and is one of a plurality of traffic lights in the frontal view of the ego vehicle, wherein each traffic light pose comprises coordinates and orientation relative to an origin of a traffic light coordinate system that is different from a map's coordinate system employed by the system to provide assistance to, or autonomously operate, the ego vehicle to traverse a route, and wherein the current pose of the ego vehicle comprises coordinates and yaw relative to an origin of the map's coordinate system, employed by the system to provide assistance to, or autonomously operate the ego vehicle to traverse a route; and
   a traffic light analysis component coupled to the ROIFTLA identification component to determine the current state of the traffic light within the ROI in the image, and output the current state of the traffic light within the ROI in the image for use to provide assistance to, or autonomously operate, the ego vehicle, wherein to apply the current pose of the ego vehicle to the plurality of traffic light poses to identify the ROI in the image of a horizon for the determination of the current state of the traffic light within the ROI in the image to be taken into consideration, the ROIFTLA identification component is to transform the coordinates and yaw of the current pose of the ego vehicle from relative to the origin of the map's coordinate system to relative to the origin of the traffic light coordinate system, and apply a distance and an orientation constraint to the transformed coordinates and yaw of the current pose of the ego vehicle and the coordinates and orientations of the plurality of traffic light poses to identify the ROI in the image for the determination of the current state of the traffic light within the ROI in the image to be taken into consideration.

2. The system of claim 1, wherein to determine the current state of the traffic light within the identified ROI in the images, the traffic light analysis component is to apply shape, contour or color analysis to a region of an image that corresponds to the identified ROI in the image.

3. The system of claim 2, further comprising one or more sensors including a camera to capture the image.

4. The system of claim 1, further comprising a localization component coupled to the ROIFTLA identification component to periodically determine in real time the current pose of the ego vehicle, and provide the current pose of the ego vehicle to the ROIFTLA identification component.

5. The system of claim 1, further comprising a non-transitory computer readable storage medium coupled to the ROIFTLA identification component to store the plurality of traffic light poses.

6. The system of claim 1, wherein the system is disposed in the ego vehicle.

7. A method for computerized assist or autonomous driving of an ego vehicle, comprising:
   receiving, by a computerized assist or autonomous driving (CA/AD) system of the ego vehicle, a current pose of the ego vehicle, wherein the current pose of the ego vehicle comprises coordinates and yaw relative to an origin of a map's coordinate system, employed by the system to provide assistance to, or autonomously operate the ego vehicle to traverse a route;
   applying, by the CA/AD system, the current pose of the ego vehicle to a plurality of traffic light poses to identify a region of interest (ROI) in an image of a front view of the ego vehicle as seen through a frontal view of the ego vehicle for determining a current state of a traffic light within the ROI in the image to be taken into consideration in providing assistance to, or autonomously operating the ego vehicle, the traffic light being one of a plurality of traffic lights in the front view of the ego vehicle, wherein each traffic light pose comprises coordinates and orientation relative to an origin of a traffic light coordinate system that is different from the map's coordinate system employed by the system to provide assistance to, or autonomously operate the ego vehicle to traverse a route, wherein to apply the current pose of the ego vehicle to the plurality of traffic light poses to identify the ROI in the image of a horizon for the determination of the current state of the traffic light within the ROI in the image of the horizon to be taken into consideration, an ROIFTLA identification component is to transform the coordinates and yaw of the current pose of the ego vehicle from relative to the origin of the map's coordinate system to relative to the origin of the traffic light coordinate system, and apply a distance and an orientation constraint to the transformed coordinates and yaw of the current pose of the ego vehicle and the coordinates and orientations of the plurality of traffic light poses to identify the ROI in the horizon for the determination of the current state of the traffic light within the ROI in the horizon to be taken into consideration;
   determining, by the CA/AD system, the current state of the traffic light within the ROI in the image; and
   providing, by the CA/AD system, assistance to, or autonomously operating the ego vehicle, based at least in part on the determined current state of the traffic light within the ROI in the image.

8. The method of claim 7, wherein determining the current state of the traffic light within the identified ROI in the image comprises applying shape, contour or color analysis to a region of an image that corresponds to the identified ROI in image.

9. The method of claim 7 further comprising periodically determining, by the CA/AD system, in real time the current pose of the ego vehicle.

10. The method of claim 7 further comprising receiving and storing the plurality of traffic light poses by the CA/AD system.

11. At least one non-transitory computer readable media (CRM) comprising a plurality of instructions configured to cause a computerized assist or autonomous driving (CA/

AD) system of an ego vehicle, in response to execution of the instructions by CA/AD system, to:

receive a current pose of the ego vehicle, wherein the current pose of the ego vehicle comprises coordinates and yaw relative to an origin of a map's coordinate system, employed by the system to provide assistance to, or autonomously operate the ego vehicle to traverse a route;

apply the current pose of the ego vehicle to a plurality of traffic light poses to identify a region of interest (ROI) in a image in front of the ego vehicle as seen through a frontal view of the ego vehicle for a determination of a current state of a traffic light within the ROI in the image to be taken into consideration in provision of assistance to, or autonomous operation of the ego vehicle, wherein each traffic light pose comprises coordinates and orientation relative to an origin of a traffic light coordinate system that is different from the map's coordinate system employed by the system to provide assistance to, or autonomously operate, the ego vehicle to traverse a route, wherein to apply the current pose of the ego vehicle to the plurality of traffic light poses to identify the ROI in the image of a horizon for the determination of the current state of the traffic light within the ROI in the image of the horizon to be taken into consideration, an ROIFTLA identification component is to transform the coordinates and yaw of the current pose of the ego vehicle from relative to the origin of the map's coordinate system to relative to the origin of the traffic light coordinate system, and apply a distance and an orientation constraint to the transformed coordinates and yaw of the current pose of the ego vehicle and the coordinates and orientations of the plurality of traffic light poses to identify the ROI in the horizon for the determination of the current state of the traffic light within the ROI in the horizon to be taken into consideration;

determine the current state of the traffic light within the ROI in the image; and output the current state of the traffic light within the ROI in the image for use for provision of assistance to, or autonomous operation of, the ego vehicle.

12. The non-transitory CRM of claim 11, wherein to determine the current state of the traffic light within the identified ROI comprises to apply shape, contour or color analysis to a region of an image that corresponds to the identified ROI in the image.

13. The non-transitory CRM of claim 11, wherein the CA/AD system is further caused to periodically determine in real time the current pose of the ego vehicle, and provide the current pose of the ego vehicle to the ROIFTLA identification component.

14. The non-transitory CRM of claim 11, wherein the CA/AD system is further caused to receive and store the plurality of traffic light poses.

15. The non-transitory CRM claim 11, wherein the CA/AD system is disposed in the ego vehicle.

* * * * *